United States Patent [19]
Thomas et al.

[11] Patent Number: 5,223,932
[45] Date of Patent: Jun. 29, 1993

[54] DYNAMIC OFFSET TO INCREASE THE RANGE OF DIGITIZATION OF VIDEO IMAGES

[75] Inventors: Robert L. Thomas; Lawrence D. Favro, both of Huntington Woods; Pao-Kuang Kuo, Troy; Li Chen; Hui J. Jin, both of Detroit, all of Mich.

[73] Assignee: Wayne State University, Detroit, Mich.

[21] Appl. No.: 639,794

[22] Filed: Jan. 10, 1991

[51] Int. Cl.$^5$ .................. H04N 5/14; H04N 5/32; H04N 5/30
[52] U.S. Cl. ........................ 358/160; 358/110; 358/111; 358/113
[58] Field of Search ............ 358/160, 111, 110, 21 R, 358/113, 36, 167, 93, 174

[56] References Cited

U.S. PATENT DOCUMENTS

| | | | |
|---|---|---|---|
| 4,399,464 | 8/1983 | Hix et al. | 358/113 |
| 4,409,615 | 10/1983 | McMann, Jr. et al. | 358/111 |
| 4,672,439 | 6/1987 | Florence et al. | 358/113 |
| 4,878,116 | 10/1989 | Thomas et al. | 358/160 |
| 4,879,598 | 11/1989 | Seto | 358/113 |
| 5,047,846 | 9/1991 | Uchiyama et al. | 358/93 |

Primary Examiner—James J. Groody
Assistant Examiner—Safet Metjahic
Attorney, Agent, or Firm—Reising, Ethington, Barnard, Perry & Milton

[57] ABSTRACT

The assembly (10) utilizes real-time imaging for detecting radiation from an object field (12) which has a component which is periodic in time. A video camera (14) detects emitted and reflected radiation from the object field (12) and produces a video signal comprising a series of pixels representing a frame of the image. A dynamically averaged offset derived from the original video signal is subtracted from the video signal leaving only information from the time-varying component of the video object field. The resulting signal is digitized by a digitizer (18) contained in a processor (16). The processor (16) averages the successive frames as synchronous images based on the periodicity of the object field (12) to eliminate unsynchronous noise from the image and to display an image synchronous with the periodicity of the object field (12). Because the final video image is a digitization of the amplified difference, the dynamic range of the corrected image is greatly increased.

23 Claims, 6 Drawing Sheets

Fig-4b

DYNAMIC OFFSET TO INCREASE THE RANGE OF DIGITIZATION OF VIDEO IMAGES

TECHNICAL FIELD

The invention relates to a real-time imaging system operating in synchronism with an object field which has components which are periodic in time wherein unsynchronous background noise is subtracted leaving only relevant, synchronous information in the image. The invention applies to any wavelength of video imaging, whether it be infrared (IR), visible, ultraviolet (UV), etc.

BACKGROUND OF THE INVENTION

Lock-in imaging systems have been utilized to obtain synchronous components from signals having steady-state and time-varying components. This technology has recently been expanded to use in video signal images.

U.S. Pat. No. 4,878,116, issued Oct. 31, 1989 and assigned to the assignee of the subject invention, discloses a vector lock-in imaging system wherein a video camera detects emitted and reflected radiation from the object field and produces the video signal comprising the series of pixels representing the frame of the image. The video signal is digitized and received by a processor which in turn synchronously averages the successive frames as in-phase and quadrature images based on the periodicity of the object field to eliminate unsynchronous noise from the image and to display the image synchronous with the periodicity of the object field.

The vector lock-in imaging system uses an infrared or visible video camera coupled to a real-time image processor and a computer workstation to perform phase-sensitive lock-in detection on all of the pixels of an image in parallel, thus achieving the effect of having 512×512 lock-in amplifiers. In that invention the processor multiplies the incoming video signal by the since and the cosine of the reference signal in real time, and averages the two in separate frame buffers to produce in-phase and quadrature images.

The basic limitation to that invention and to a wide variety of high speed video imaging systems is the accuracy to which each pixel of the image is digitized. Typically, this digitization is carried out to 8-bit accuracy, i.e., to one part in 256. The reason for this limitation is the difficulty and expense of maintaining both high speed and high accuracy in the single digitization process.

SUMMARY OF THE INVENTION AND ADVANTAGES

The invention is a method and apparatus for producing images which are synchronous with the periodicity of an object field utilizing a video camera for producing a video signal comprising frames of the image. The method and apparatus implements the steps of producing a reference signal indicating the occurrence of synchronous signals representing the periodicity of the object field, detecting radiation from the object field, producing a video signal of the image comprising a series of pixels representing a frame of the image of the object field and for producing a timing signal for the pixels of the frame. Further included is obtaining and subtracting a time-averaged offset from the video signal producing a time-varying signal, amplifying the time-varying signal, and storing the frame of the time-varying signal in synchronism with the reference signal.

In the more specific design, the digitized video image is averaged over a period of time corresponding to a few frames, and the resulting short-term averaged image is converted to an analog video image. This analog image is in turn subtracted pixel by pixel from the incoming video signal to the digitizer, and the resultant video differential signal is amplified prior to the 8-bit digitization. Because of the fact that the resultant video image is an 8-bit deep digitization of the difference signal, the dynamic range of the corrected image is greatly increased.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
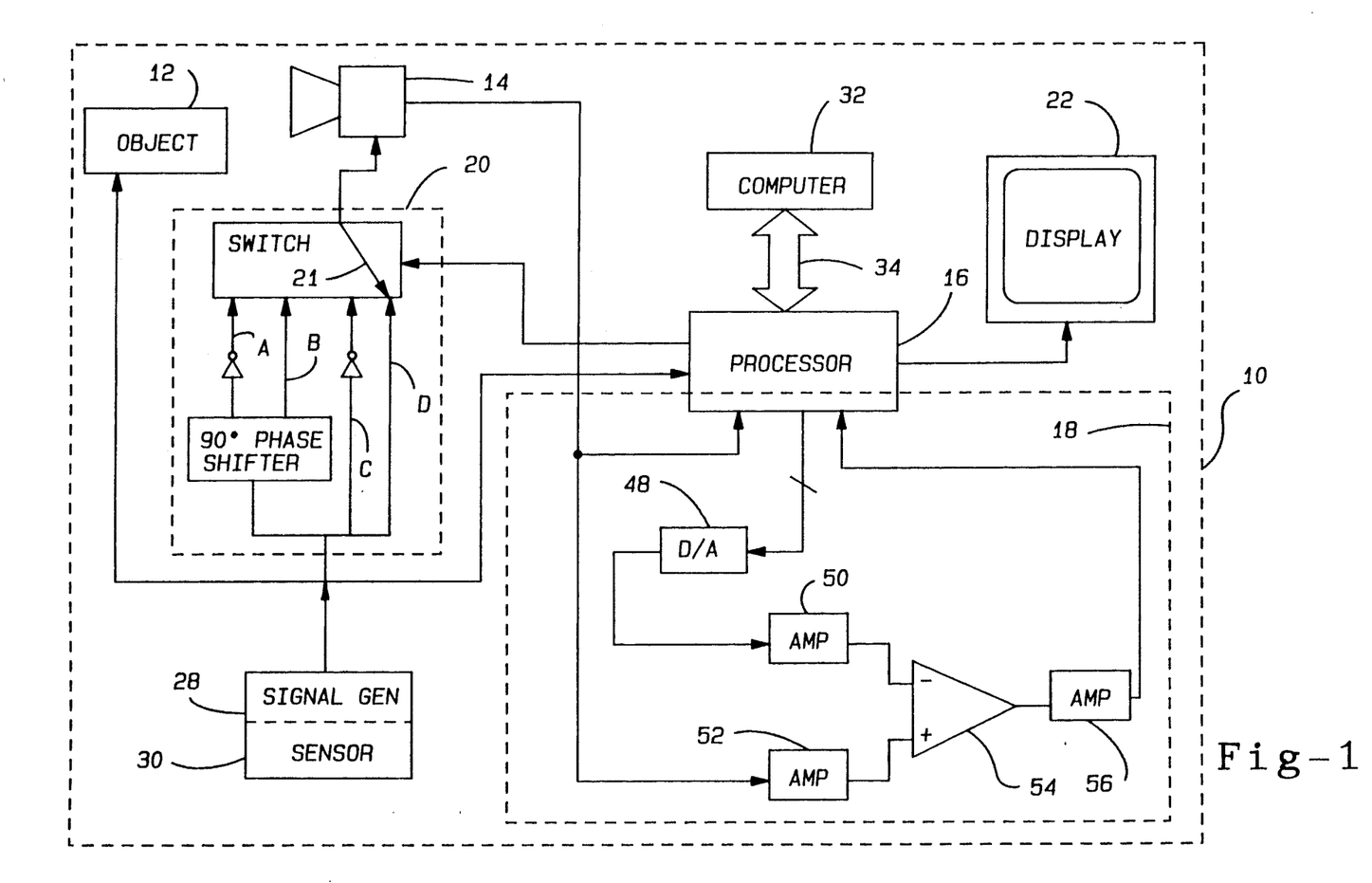
FIG. 1 is a block diagram and schematic diagram of the subject invention.

An imaging assembly 10 for producing dynamically offset images in synchronism with the periodicity of an object field 12 is generally shown at 10 in FIG. 1. Dynamically offset images of the synchronous component of the object field 12 are produced. The assembly 10 requires that the portion of interest of the video signal be periodic, or quasi-periodic, and be capable of serving as a reference frequency for synchronization of the assembly 10. In some cases this periodicity may be intrinsic, e.g., the combustion process in an engine. In other cases, the periodicity may be induced by an external stimulus, e.g., a modulated laser beam, flash lamp, a modulated electromagnetic field, or modulated electric currents. The assembly 10 achieves, in parallel, and in real time, the effect of lock-in signal averaging for each of the pixels produced by the video camera, and at the same time increases the dynamic range of the resultant synchronous image through the use of an offset. Thus, an advantage over prior art imaging systems is the resultant improvement in sensitivity without the relinquishing of the advantage of real-time imaging offered by prior art assemblies.

The object field 12 to be imaged may be comprised of any field which is capable of generating its own periodic radiation or generating radiation in response to being externally, periodically stimulated. Examples of such applicability include: synchronous thermal wave imaging for nondestructive evaluation in manufacturing processes; synchronous detection of fluorescence resulting from modulated ultraviolet light used as an external stimulus useful, for example, in the examination of objects of art, chemical processing, synchronous detection of holographic images with periodic mechanical vibration, modulated thermoreflectance, etc.

The assembly 10 includes camera means 14 for detecting radiation from an object field 12 providing video and sync timing information which may be in the form of separate signals or may be in the form of composite video signals in which the video and sync timing signals are combined into one composite video signal. These signals comprise electrically the image of the object field 12 and include timing and phase information of each frame of the image. The video signal comprises passive and active radiation. The passive radiation is that which occurs naturally, such as reflected radiation or the object's own emitted radiation. The active radiation is that resulting from external periodic irradiation of the object field 12 or that radiation internally generated by the object field 12. A conventional television camera, infrared video camera, CID camera, or other camera 14 may be used to obtain the image in the form of pixels accumulated to produce a frame. In this embodiment, the camera 14 produces a composite video signal wherein each pixel of a frame of the image is serially transmitted, and therefore the frames are serially transmitted. The composite video signal is a continuous signal interrupted after each frame. The camera 14 repeatedly forms an image of the object field 12 and continuously produces the composite video signal comprising the pixels forming the image. The pixels forming one image constitute a frame and the composite video signal transmits images, frame after frame. The frame is comprised of lines of pixels. In effect, the assembly 10 increases the number of lock-in channels to that of the number of pixels in the video image, namely 262,144 in the preferred embodiment. Typically, 25 or 30 frames/second are obtained by the camera 14. The timing and phase information enables a processor means 16 to derive detailed information about the timing of each pixel of the image. This provides the mechanism for acquiring digital images in synchronism with the periodicity of the object field 12, as subsequently described.

The assembly includes offset means 18 for receiving the video signal and subtracting a time-averaged offset therefrom to produce a data signal containing substantially only time-varying information of the image of the object field. In general, the offset means 18 eliminates the dc and slowly varying background signal from the video signal so that during the digitization step, the digital resolution of the time-varying data is increased during the digitization step. Without the offset means 18, the video signal which is digitized comprises the dc signal as the major portion of the video signal. Therefore, the time-varying data would be limited in dynamic range if the offset was not included because it represents a small percentage of the total video signal.

The assembly 10 includes processor means 16 for receiving the video signal, accumulating a frame of the image and averaging the frame with subsequent frames producing an image signal representative of the averaged frame image of the time-varying information synchronous with the periodicity of the object field 12. The processor means 16 obtains a sync timing signal from the composite video signal produced by the camera 14 representing time and phase information of each frame and separately receives a reference signal representing the periodic external stimulation or internally produced periodicity of the object field 12, as will be described subsequently. Based upon the phase relationship between the timing signal and reference signal, the processor means 16 obtains the in-phase image of the object field 12, in a fashion similar to that of the aforementioned patent. The processor means 16 may be comprised of off-the-shelf components, as will be described subsequently. The processor means 16 acts as the lock-in device for each pixel of a frame of the entire image. It should be understood that the quadrature image may be obtained as in the aforementioned patent.

The assembly 10 includes display means 22 for receiving the analog display signal and for displaying the synchronous images of the object field 12. Any display or CRT terminal capable of graphics display may be used.

The preferred embodiment of the subject invention utilizes an object field 12 which is externally periodically stimulated at the reference frequency, or an object field 12 which internally produces periodicity of the reference signal. Stimulus control means 28 is included for externally stimulating the object field 12 at the reference signal frequency. The stimulus control means 28 may provide the periodicity by modulated laser beam, flash lamp, modulated electric currents, or any other means which will produce the requisite periodic or quasi-periodic radiation. The periodicity may be synchronized with the camera 14, or the system may operate asynchronously with the processor means 16 monitoring same. If the periodicity occurs naturally in the object field 12, such as in an engine, the stimulus control means 28 is unnecessary. Instead, a sensor means 30 senses the periodicity of the object field 12 to produce the reference signal for the processor means 16.

In the preferred embodiment, a phase correlator means 20 provides a sequentially switched set of four reference signals A, B, C, D by switch 21 which differ in phase incrementally by 90°. The output of the phase correlator means 20 from switch 21 is used to control the intensifier of the CID camera means 14. These signals are switched under the control of the processor means 16 in synchronism with the switching of image buffers and look up tables inside the processor means 16. The averaging of the frames of data is performed by multiplication and accumulation operations depending on the phase relationships.

A computer 32 is connected with the processor means 16 for receiving the final image and performing post-processing as described in the aforementioned patent, incorporated by reference herein. The computer 32 and correlator means 20 communicates with the processor means 16 via a VME bus 34.

Figure 2A:
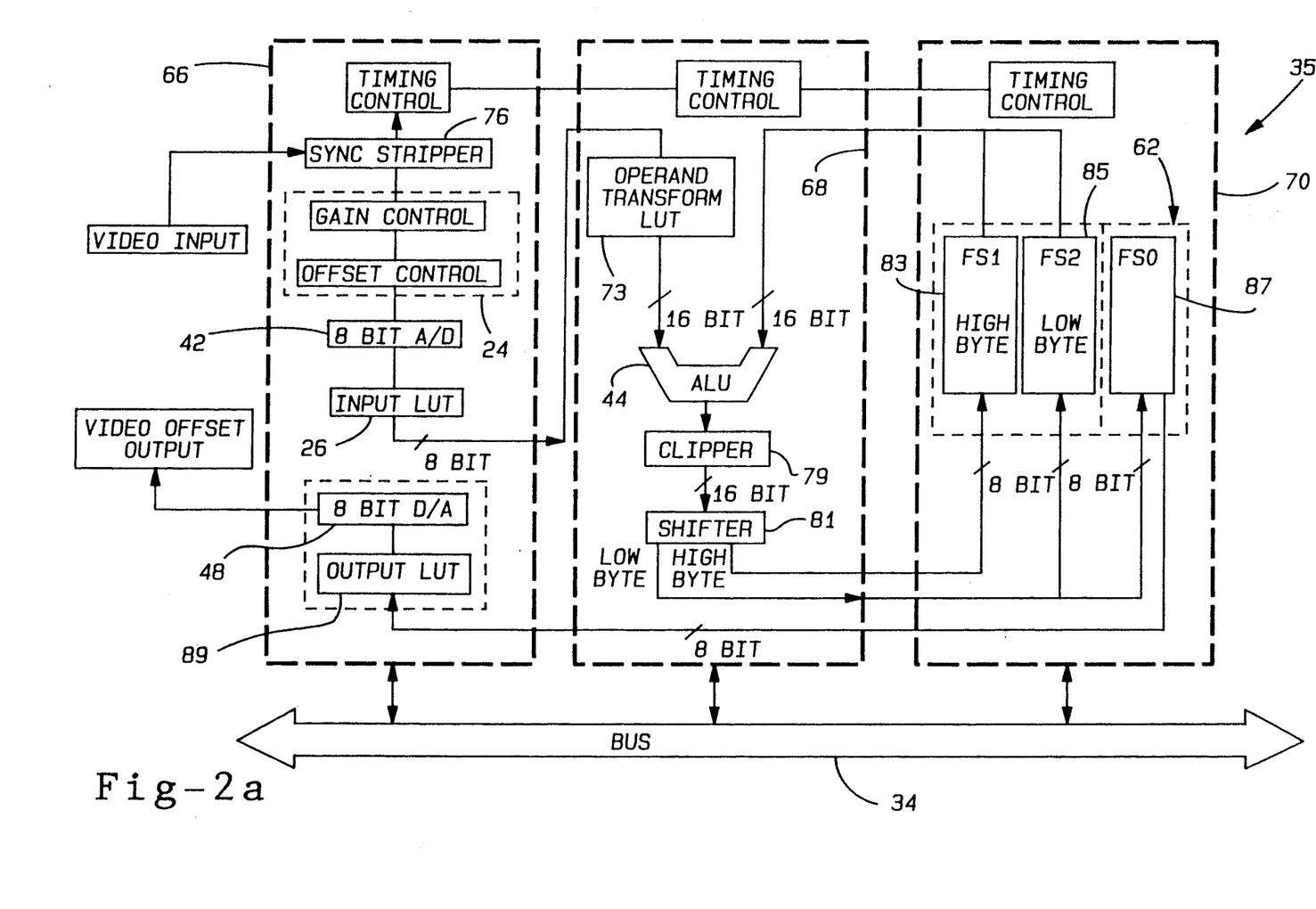
FIGS. 2a–b are schematic diagrams of the processor means.
Figure 2B:
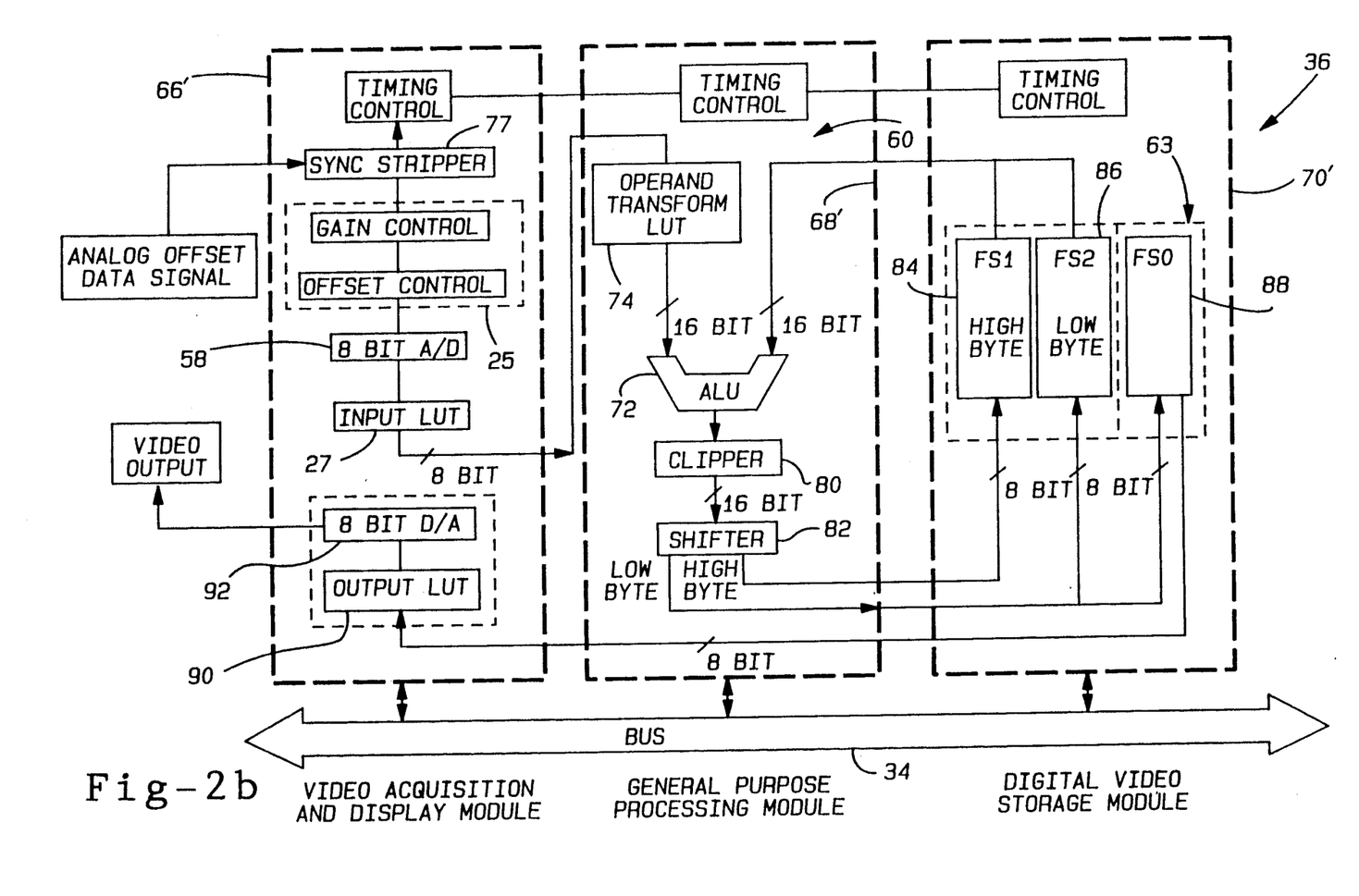
Figure 3:
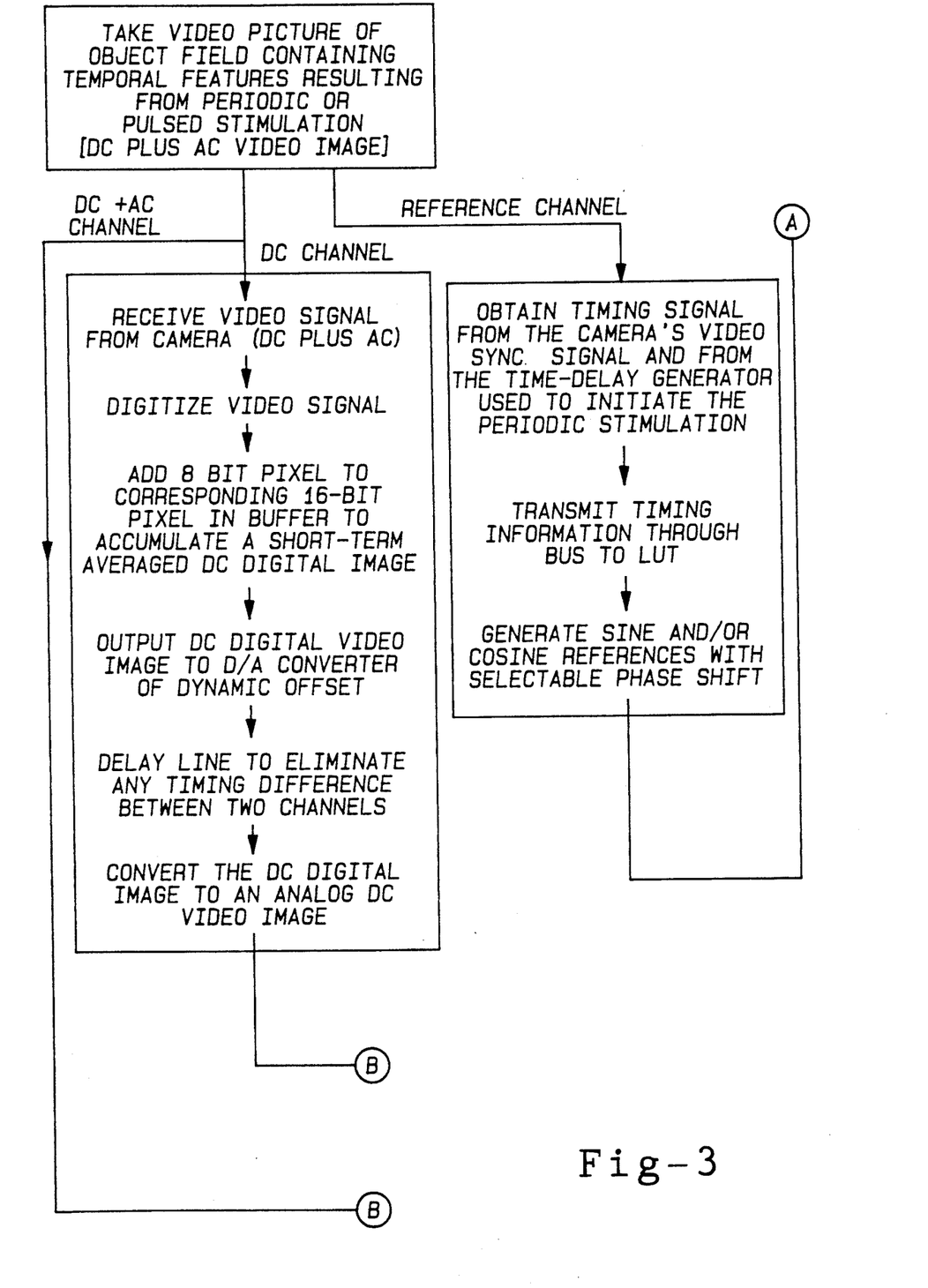
FIGS. 3a and 3b is a flow chart of the subject invention.
Figure 3A:
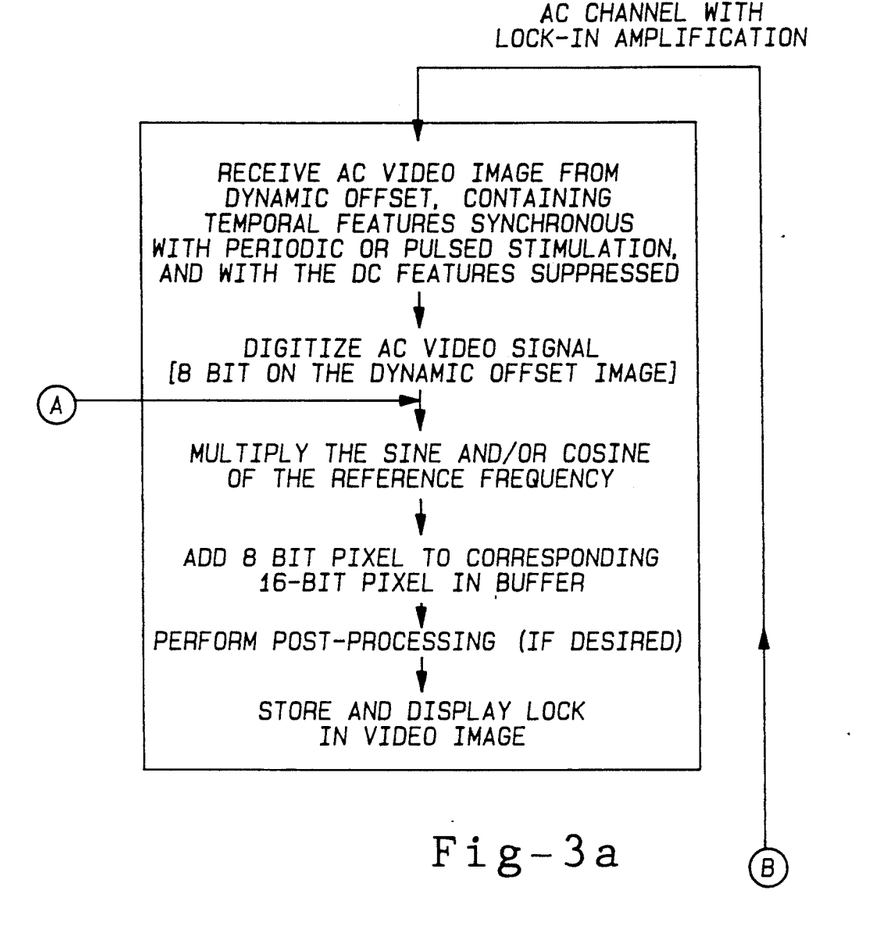
Figure 3B:
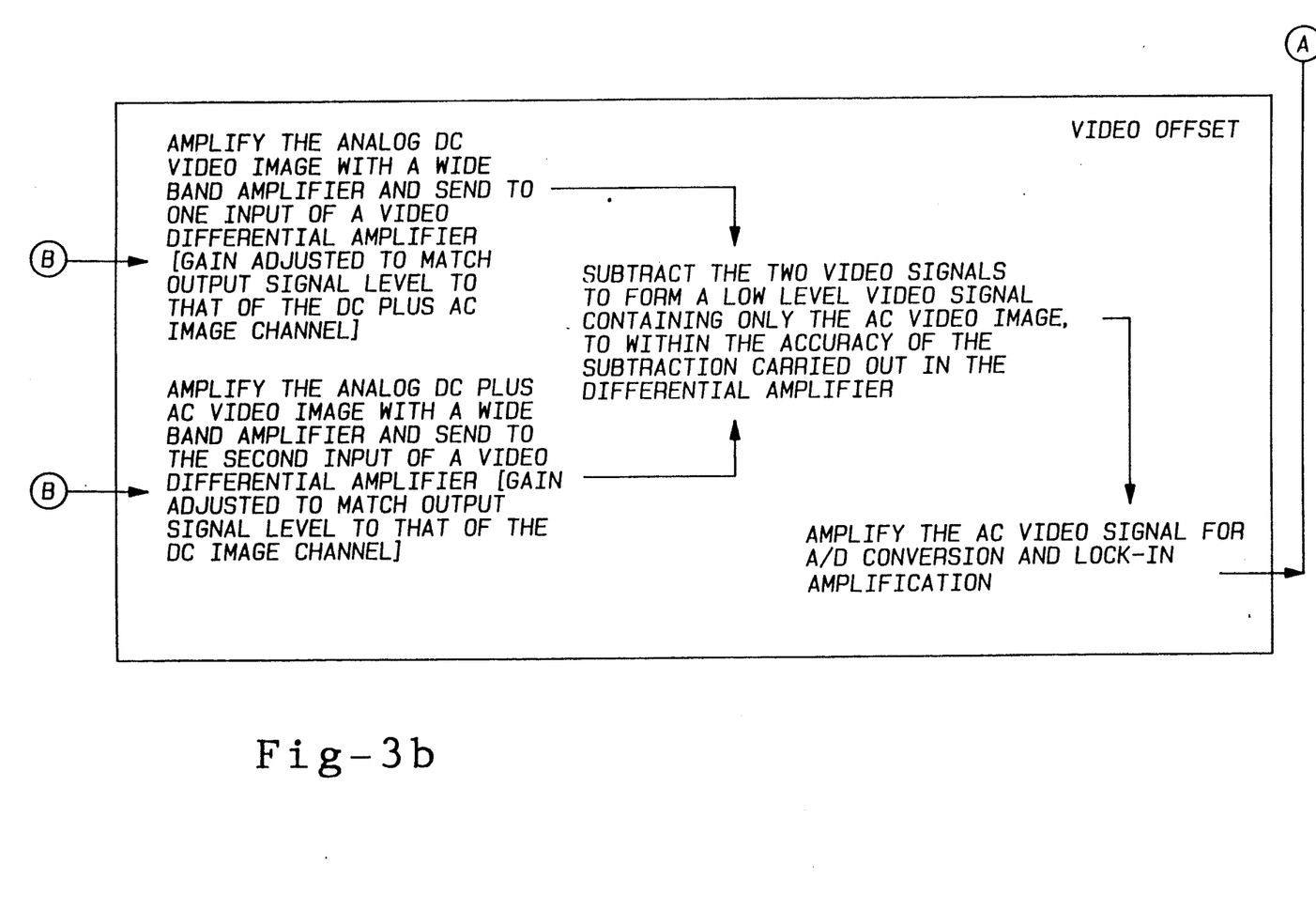

The offset means 18 is specifically illustrated in FIG. 1, and the processor means 16 is more specifically illustrated in FIGS. 2a-b.

The lock-in detection is carried out in two channels 35, 36 of the processor means 16. The first channel 35 establishes the dynamically changing offset reference image and the second channel 36 performs the in-phase lock-in operation. This is accomplished by merging the dynamically offset video signal with the sine of the phase of the reference signal frequency, and accumulating the results in the processor means 16. The sine function of the reference signal may be approximated, for example by a square wave of the same phase relationship.

Both channels 35, 36 are physically configured the same, except fewer functions are performed in the first channel 35. Both channels include: sync stripper 76, 77 for deriving the master timing signal, gain and offset control 24, 25 for adjusting the gain and offset of the video signal, analog-to-digital converter 42, 58 for digitizing the video signal into 8-bits per pixel, input LUT (look-up table) 26, 27 and operand transform LUT 73, 74 for obtaining an operand from the LU, arithmetic logic unit (ALU) 44, 72 for performing the operation with the operand on the digitized data, clipper 79, 80 and shifter 81, 82, image buffer 62, 63, output LU 89, 90, and digital-to-analog converter 48, 92. The image buffer 62, 63 comprises high and low byte 8-bit buffers 83, 85, 84, 86 and an 8-bit output buffer 87, 88.

The first channel 35 of the processor means 16 utilizes the sync stripper 76, gain and offset control 24 and offset digitization means 42 for receiving and digitizing the video signal to produce a digital video signal. The offset digitization means 42 is an 8-bit analog-to-digital converter. The first channel 35 utilizes the ALU 44 for receiving the averaging subsequent frames of the digital signal to establish a dynamically varying digital reference image. The 16-bit ALU 44 performs an average of the newly acquired frame from with the previously acquired and stored frames thereby establishing a short-term running average frame. The short term averaged dc image is stored in the 16-bit dc buffer 62. The 8 bit D/A 48 converts the short term averaged image from buffer 62 to an analog video offset output signal. The D/A 48 may be a separate component apart from the processor means 16.

The offset means 18 includes an offset amplifier 50 for amplifying the analog video offset signal and a second video amplifier 52 for amplifying the video signal from the camera 14. The offset means 18 also includes subtracting means 54 for subtracting the amplified analog video offset signal from the amplified camera video signal to produce a low level video difference signal. The video difference signal is principally composed of the information from the time-varying portion of the object field 12. Data amplifier means 56 amplifies the video difference signal for producing an amplified offset data signal which is transmitted to the processor means 16 for input into the second channel 36. The amplifiers 50, 52, 56 and subtracting means 54 may be comprised of operational amplifiers configured as such, as commonly known in the art.

The second channel 36 of the processor means 16 utilizes the sync stripper 77, gain and offset control 25, and image digitizer means 58 for converting the amplified offset data signal into a digital image signal. The digitizer means 58 may be an 8-bit analog-to-digital converter. The image digitizer means 58 receives and converts the analog offset data signal from the offset means 18 into the digital video signal wherein the coding represents the intensity of each pixel of the image. In the preferred embodiment, the digital video signal is comprised of an eight bit binary code signal per pixel. In other words, the image digitizer means 58 converts the serially received analog pixel information and converts each pixel of information into the eight bit binary code. Because the final video image is an 8-bit digitization of the amplified difference, the dynamic range of the corrected image is greatly increased. The input LUT 27, operand transform LUT 74 and ALU 72 perform the in-phase imaging to process frames of images in-phase with the reference signal. The in-phase buffer means 63 stores the averaged in-phase image portion. In the preferred embodiment, the in-phase image buffer 63 is 512×512×16 bits deep. The imaging means 60 utilizing means 74, 72, 80, and 82 is as in the aforementioned patent.

When a predetermined number of frames have been accumulated by the processor means 16, the results are normalized and displayed by the display means 22 as in-phase images, analogous to the way a vector analyzer produces in-phase components by accumulating a single signal for a period of time. The advantage of parallel processing thereby gained is approximately a quarter of a million.

The preferred embodiment of the processor means 16 utilizes periodic illumination for the external stimulus of the object field 12. The camera means 14 is a commercial CID camera with a gated intensifier, such as manufactured by ITT. The digitizers 42, 58 digitize the video signal at 10 MHz into an 8-bit digitized video signal.

As indicated in FIG. 2a–b, the digitizers 42, 58 reside on boards 66, 66' and the processor means 16 consists of at least four more boards 68, 70, 68', 70' residing on the bus 34. The boards 66, 68, 70, 66', 68', 70' are manufactured by Datacube, Inc. The display means 22 and computer means 32 are implemented by the Sun 3/160C Color Workstation. The pixel timing signals are sent from the first board 66 to all the boards 68, 70, 66', 68', 70' on a sixteen conductor flat cable 34 in a daisy chain. The functions of the boards 66, 68, 70, 66', 68', 70' are implemented by software which follows the flow chart in FIG. 3. The two boards 68', 70' establish the lock-in operations. The board 68' comprises the in-phase imaging means 60 and the board 70' comprises the buffer means 63. The imaging means 60 performs the functions of multiplying and accumulating the digitized video images in the correct sequence according to the phase information they receive from the bus 34 and is implemented by the ALU (arithmetic logic unit) 72. During each frame, a sixteen bit video data stream is read from the in-phase buffer means 63 and is merged with the eight bit data from the digitizer means 58 in the ALU 72 using the multiply and accumulate operation.

The imaging means 60 processes the in-phase portion of the video data and stores it in the in-phase buffer means 63. The imaging means 60 accumulates the digitized video signal in the in-phase buffer means 63. The computer means 32 sends commands to the imaging means 60 in the form of a control program to operate the processor means as stated above and transmit control signals to initiate operation thereof. The processor means receives the phase information on the bus and points to the position in the LUT identifying the appropriate phase of the sine wave. The LUT effects the multiplication by producing the sine value and transmits the signal to the ALU 72. For each pixel the above process occurs. All the sine values are stored in memory of the LUT 74. The sine values utilized may be as in the aforementioned patent. The ALU 72 performs the multiplication and averages same with the buffer 63.

The processing boards 68, 68' are capable of multiplying, accumulating and shifting image data in a pipeline fashion with a 10 MHz throughput. Each memory input is a read-and-modify operation, in order to allow accumulation of the data corresponding to each pixel in the same memory location. The pipe-line delay is compensated for by using a pan operation (an increment of the horizontal base register by a count equal to the pipe-line delay at the pixel rate) at the beginning of each vertical trace. The controlling program resides in the Sun workstation 22, 32. All the image processing boards 66, 68, 70, 66', 68', 70 reside on a VME bus 34 and are housed in a separate card cage which is connected to the workstation's VME bus 34 by bus extension boards. All real-time image processing is handled by the Datacube boards 66, 68, 70, 66', 68', 70.

More specifically, in the operation of the processor 16, the first board 66 receives the input RS-170 analog video signal and a sync stripper 76 derives the master timing signal to synchronize all the boards 66, 68, 70, 66', 68', 70' thereto. The video signal is sent to the digitizer 42 comprising 8-bit A/D (analog to digital) converter. The resulting digitized video signal is a 10 MHz stream of sequential data which is sent to the digital to analog converter 48. This offset signal is sent to the offset means 18. The offset means 18 produces the amplified offset data signal. The computer means 32 produces a programmed set of commands for the boards 66, 68, 70, 66', 68', 70'. The commands cause the data signal to be transformed by the LUT 74 in accordance with the phase relationship from the stimulus means 28 or sensor means 30. The processing board 68' receives the phase information, processes the data, and puts out a 16-bit modified signal from the operand transform LUT 74. The signal is combined with the 16-bit data previously accumulated in the storage board 70, using the arithmetic logic unit (ALU) 72, clipper 80 and shifter 82. The signal from the ALU 72 is sent back to the buffer 63 replacing the previously accumulated data, and the entire process is repeated until an appropriate number of averages have been carried out. The buffer 63 is capable of storing three (512×512×8-bit) frames of digital video information. The 16-bit image data are stored using two 8-bit image buffers 84, 86 (high byte and low byte). The processing means 16 can perform temporal and spatial filtering, image merging, image subtraction, and addition, and/or other simple arithmetic operations in real time. An output buffer 88 converts the 16-bit stored image to 8-bits, which a D/A converter 92 converts to analog.

The image data that are transferred to the Color Workstation 22, 32 are in the 8-bit format. These data are obtained from the 16-bit image data by selecting an 8-bit image window with optimum contrast, but without overflow of the data. The image is displayed with a color map software system.

It is to be understood that the invention is not limited to the specific application of visible imaging, but the embodiment is an example of the assembly's capabilities.

The invention also includes a method for producing an image of the synchronous component of an object field. The method for producing images synchronous with the periodicity of an object field utilizes a video camera for producing a video signal comprising frames of the image. A reference signal is produced indicating the occurrence of a synchronous pulse representing the periodicity of the object field. Radiation is detected from the object field producing a video signal of the image comprising a series of pixels representing a frame of the image of the object field and for producing a timing signal for the pixels of the frame. A dynamically averaged offset image is obtained and subtracted from the video signal, and amplified producing an amplified difference signal. The frame of the amplified difference signal is stored in synchronism with the reference signal. The stored frame is averaged with subsequently received frames having pixels synchronous with the reference signal producing a lock-in image with enhanced dynamic range.

The method includes digitizing the video signal, averaging over a period of time corresponding to a few frames to form a short-term averaged (dc) image, converting the digital dc signal to an analog offset image signal, subtracting the analog offset image signal from the video signal to produce a data signal containing substantially only the synchronous periodic information of the object field, amplifying and digitizing the data signal producing a digital data signal, receiving the timing signal and the reference signal to produce synchronizing signals, and transmitting multiply and accumulate commands using the sine factor for the storing and averaging prior to the reception of subsequent frames. The method further includes storing the phase relationship of the timing signal with corresponding cosine multiplier factors, the multiply command including the multiplier factor for each pixel, and averaging successive frames of the object field in-phase and/or in quadrature with the reference signal.

Therefore, the subject invention provides a video camera combined with a video image processor to simulate a large number of lock-in analyzers when the object is illuminated or stimulated with the signal synchronized with the reference signal of the lock-in detection. Furthermore, the subject invention suppresses the non-synchronous portion of the object field by means of a dynamic offset derived by performing a short-term average of the video signal. The resulting information of each pixel of the offset image is handled as if it were being processed simultaneously by its own lock-in analyzer, in synchronism with the periodic portion of the image.

Figure 4A:
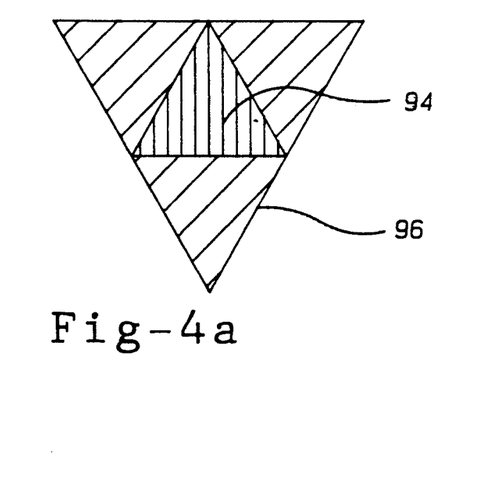
FIGS. 4a–b are illustrations of an application of the subject invention.
Figure 4B:
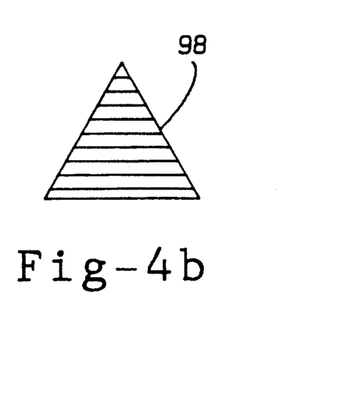

As an example, FIG. 4a shows schematically a pattern of laser light on a screen. In this pattern there is a large triangle 96 which has a constant intensity, and a smaller triangle 94 which has an intensity which has both a steady intensity equal to that of the large triangle and a superimposed periodic intensity which is varying at a frequency of 1 MHz and which is 2000 times smaller than the steady component. FIG. 4b is a representation of the dynamically offset lock-in image 98 obtained with the subject invention. This corresponds to obtaining an 11-bit sensitivity with the use of an 8-bit digitizer. Therefore, the dynamic range has been increased by 3 bits in this example.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for producing images synchronous with a periodicity of an object field utilizing a video camera (14) for producing a video signal comprising frames of an image, the method including the steps of:

producing a reference signal indicating occurrences of synchronous pulses representing the periodicity of the object field (12); detecting radiation from the object field (12) producing an analog video signal of the image comprising a series of pixels representing a frame of the image of the object field (12) and for producing a timing signal for the series of pixels of the frame; digitizing the analog video signal to produce a digital signal; averaging a plurality of frames of the image represented by the digital signal to substantially eliminate short-term variations in the plurality of frames producing a time-averaged offset; subtracting the time-averaged offset from the analog video signal producing a time-varying signal; amplifying the time-varying signal;

digitizing and storing a frame of the time-varying signal in synchronism with the reference signal.

2. A method as set forth in claim 1 further characterized by averaging the stored frame with subsequently received frames having pixels synchronous with the reference signal producing an image signal.

3. A method as set forth in claim 1 further characterized by converting the time-averaged offset to an analog offset image signal.

4. A method as set forth in claim 3 further characterized by subtracting the analog offset image signal from the analog video signal to produce a differential video data signal containing only time-varying information of the object field.

5. A method as set forth in claim 4 further characterized by amplifying and digitizing the differential video data signal producing a digital data signal.

6. A method as set forth in claim 5 further characterized by receiving the timing signal and the reference signal to produce synchronizing signals, and transmitting multiply and accumulate commands for the storing and averaging prior to the reception of subsequent frames, using a sine multiplier for each pixel.

7. A method as set forth in claim 6 further characterized by storing phase relationship of the timing signal with corresponding cosine multiplier factors, the multiply command including a multiplier factor for each pixel.

8. A method as set forth in claim 6 further characterized by averaging successive frames of the object field in-phase with the reference signal.

9. A method as set forth in claim 8 further characterized by averaging successive frames of the object field in-quadrature with the reference signal.

10. An imaging assembly for producing images synchronous with a periodicity of an object field (12), said assembly comprising:
reference means (32) for producing a reference signal representing the periodicity of an object field; camera means (14) for detecting radiation from the object field (12) producing an analog video signal of an image of the object field (12) comprising a series of pixels representing a frame of the image of the object field (12), and for producing a timing signal for said pixels of said frame; processor means (16) for receiving a time-varying signal representative of said frame of said video signal and storing said frame in synchronism with said reference signal, for averaging said stored frame with subsequently received frames having said pixels synchronous with said reference signal producing an image signal; said processor means (16) including offset digitization means (42) for receiving and digitizing said video signal to produce a digital signal, and offset averaging means (44) for receiving and averaging subsequent frames of said digital signal to substantially eliminate short-term variations in said time-varying information producing a time-averaged offset; and offset means (18) for receiving said analog video signal and subtracting said time-averaged offset with its shape unmodified therefrom and for producing a time-varying signal containing substantially only time-varying information of said image of said object field for said processor means.

11. An assembly as set forth in claim 10 further characterized by including digital converter means (48) for converting said time-averaged offset to an analog offset image signal.

12. An assembly as set forth in claim 11 further characterized by said offset means (18) including subtracting means (54) for subtracting said analog offset image signal from said analog video signal to produce a differential video data signal containing substantially time-varying information of the image.

13. An assembly as set forth in claim 12 further characterized by said offset means (18) including ac amplifier means (56) for amplifying said differential video data signal.

14. An assembly as set forth in claim 13 further characterized by said processor means (16) including digitization means (58) for digitizing said amplified differential video data signal producing a digital data signal.

15. An assembly as set forth in claim 14 further characterized by said processor means (18) including computer means (32) for receiving said video signal to produce said timing signal and for receiving said reference signal to produce synchronizing signals and to transmit multiply and accumulate commands to said processor means for the averaging.

16. An assembly as set forth in claim 15 further characterized by including memory means (74) for storing a look-up table containing by phase relationship of said timing signal to said reference signal a sine multiplier factor for each relationship, said multiply command including said multiplier factor for each of said pixels.

17. An assembly as set forth in claim 16 further characterized by said processor means (16) including in-phase channel imaging means (60) for averaging successive frames of said object field in-phase with said reference signal.

18. A method for producing images synchronous with a periodicity of an object field utilizing a video camera (14) for producing a video signal comprising frames of an image thereof, the method including the step of:
producing a reference signal indicating occurrences of synchronous pulses representing the periodicity of the object field (12);
detecting radiation from the object field (12) producing an analog video signal of the image comprising a series of pixels representing a frame of the image of the object field (12) and containing time-varying information;
digitizing the video signal to produce a digital signal representative of the frames;
averaging the digital signal of a plurality of frames of the image to substantially eliminate short-term variations in the time-varying information producing a time-averaged offset representative of substantially only non-periodic information in the video signal;
converting the time-averaged offset comprising only the non-periodic information from the video signal to an analog offset image signal,
subtracting the analog offset image signal from the analog video signal to produce a time-varying signal containing substantially only time-varying information of the object field;
digitizing and storing a frame of the time-varying signal in synchronism with the reference signal;
averaging successive frames of the object field;
receiving the timing signal and the reference signal to produce synchronizing signals;

transmitting commands for the storing and averaging prior to the reception of subsequent frames;

modifying the frame of the time-varying signal based on phase relationship between the reference signal and timing signal.

19. A method as set forth in claim 18 further characterized by amplifying the analog offset signal and the analog video signal prior to the subtracting to adjust the gains to match the levels of the signals.

20. A method as set forth in claim 4 further characterized by amplifying the analog offset signal and the analog video signal prior to the subtracting to adjust the gains to match the levels of the signals.

21. An assembly as set forth in claim 12 further characterized by said offset means (18) including amplifier means for amplifying the analog offset signal and the analog video signal prior to the subtracting for gain adjustment to match the levels of the signals.

22. A method for producing images synchronous with a periodicity of an object field utilizing a video camera (14) for producing a video signal comprising frames of an image, the method including the steps of:

producing a reference signal indicating occurrences of synchronous pulses representing the periodicity of the object field (12); detecting radiation from the object field (12) producing a video signal of the image comprising a series of pixels representing a frame of the image of the object field (12) and for producing a timing signal for the series of pixels of the frame; digitizing the video signal to produce a digital signal; averaging a plurality frames of the image represented by the digital signal to substantially eliminate short-term variations in the plurality of frames producing a time-averaged offset; subtracting the time-averaged offset from the video signal producing a time-varying signal; amplifying the time-varying signal; storing a frame of the time-varying signal in synchronism with the reference signal.

23. An imaging assembly for producing images synchronous with a periodicity of an object field (12), said assembly comprising:

reference means (32) for producing a reference signal representing the periodicity of an object field; camera means (14) for detecting radiation from the object field (12) producing an video signal of an image of the object field (12) comprising a series of pixels representing a frame of the image of the object field (12), and for producing a timing signal for said pixels of said frame; processor means (16) for receiving a time-varying signal representative of said frame of said video signal and storing said frame in synchronism with said reference signal, for averaging said stored frame with subsequently received frames having said pixels synchronous with said reference signal producing an image signal; said processor means (16) including offset digitization means (42) for receiving and digitizing said video signal to produce a digital signal, and offset averaging means (44) for receiving and averaging subsequent frames of said digital signal to substantially eliminate short-term variations in said time-varying signal producing a time-averaged offset; and offset means (18) for receiving said video signal and subtracting said time-averaged offset with its shape unmodified therefrom and for producing a time-varying signal containing substantially only time-varying information of said image of said object field for said processor means.

* * * * *